United States Patent [19]

Menzel

[11] 4,260,111
[45] Apr. 7, 1981

[54] DRIP IRRIGATION CONDUIT

[75] Inventor: S. W. O. Menzel, San Diego, Calif.

[73] Assignee: Reed Irrigation Systems, El Cajon, Calif.

[21] Appl. No.: 840,983

[22] Filed: Oct. 11, 1977

[51] Int. Cl.³ .............................................. A01G 25/02
[52] U.S. Cl. ..................................... 239/450; 239/542
[58] Field of Search ............... 239/542, 546, 602, 450, 239/145, 547; 405/36, 39, 40, 43, 44, 47-49, 51

[56] References Cited

U.S. PATENT DOCUMENTS

| | | | |
|---|---|---|---|
| 2,555,201 | 5/1951 | Nordell | 239/145 X |
| 2,749,180 | 6/1956 | Andrews | 239/450 |
| 2,981,072 | 4/1961 | Brewington | 405/47 |
| 3,361,359 | 1/1968 | Chapin | 239/145 |
| 3,517,702 | 6/1970 | Mueller et al. | 138/128 |
| 3,654,049 | 4/1972 | Ausnit | 138/168 X |
| 3,777,987 | 12/1973 | Allport | 239/542 |
| 3,860,179 | 1/1975 | Costa | 239/542 |
| 3,903,929 | 9/1975 | Mock | 239/145 X |
| 4,009,832 | 3/1977 | Tiedt | 239/542 |

Primary Examiner—Andres Kashnikow
Attorney, Agent, or Firm—Gordon L. Peterson

[57] ABSTRACT

A drip irrigation conduit comprising first and second elongated tubes. The tubes have an outer wall of sheet material defining the outer periphery of the tubes. A common wall of sheet material extends from one region of the outer wall to another region of the outer wall to separate the interiors of the tubes. A portion of the common wall overlaps a portion of the outer wall, and these overlapping portions have confronting surfaces. At least regions of the confronting surfaces are spaced apart to define a transfer passage leading from the first tube to the second tube. Discharge orifices lead from the second tube to the exterior of the outer wall.

15 Claims, 9 Drawing Figures

U.S. Patent   Apr. 7, 1981   4,260,111
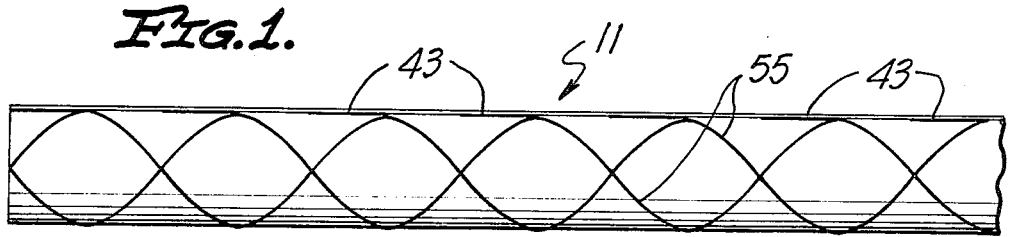
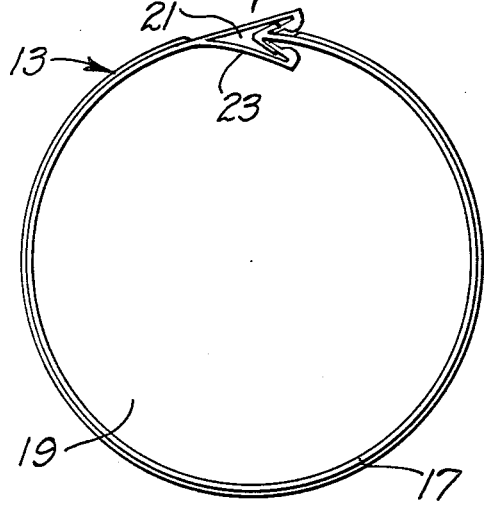
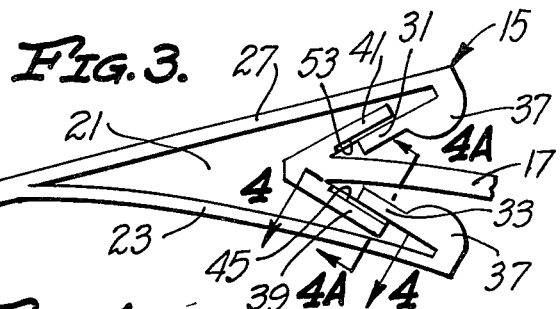
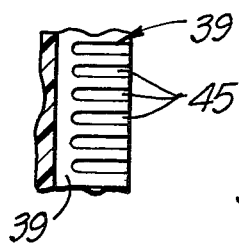
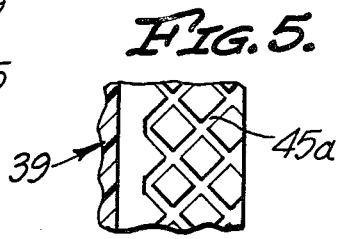
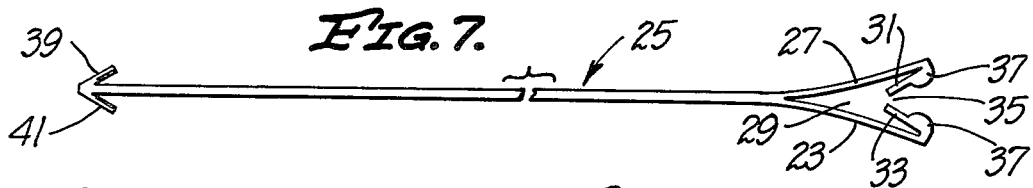
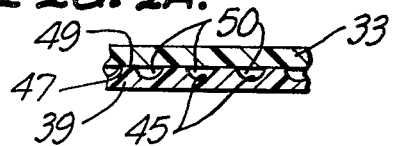
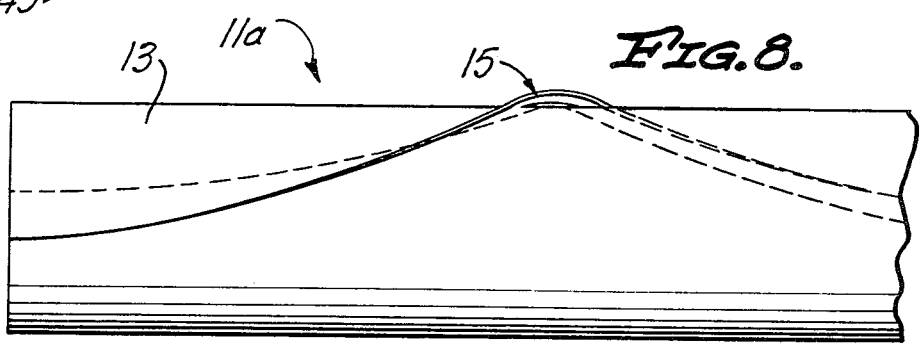

DRIP IRRIGATION CONDUIT

BACKGROUND OF THE INVENTION

Multiple passage irrigation conduits typically include at least two tubes, one of which is adapted to be coupled to a source of water under pressure. A series of transfer passages pass water from the first tube to the second tube and discharge orifices allow the water to pass from the second tube to the environment. A drip irrigation conduit of this type is shown in Mock Pat. No. 3,903,929. If more than two tubes are used, the discharge orifices of the second tube pass the water into the third tube and so on until the final tube passes the water to the environment.

One advantage of a multiple passage drip irrigation conduit is that the multiple passages facilitate pressure reduction of the water. This assures that the water will pass from the drip irrigation conduit to the environment at the desired slow drip or trickle rate. Pressure reduction can be obtained in different ways, including appropriately sizing the total area of the transfer passage and the total area of the discharge orifices or by using a capillary tube or restricted orifices which present sufficient friction to fluid flow so as to provide the desired slow drip rate.

Although multiple passage drip irrigation conduits have numerous advantages, some difficulty has been experienced with the blockage of the transfer passages. One reason for this is that the transfer passages of the prior art must be of relatively small diameter in order to provide the desired pressure drop.

SUMMARY OF THE INVENTION

The present invention provides a multiple passage drip irrigation conduit in which blockage of the transfer ports and the discharge orifices is much less likely to occur. In addition, the irrigation conduit of this invention can be shipped in a flat condition as a one-piece member of sheet material and assembled on the site where irrigation is to occur.

The drip irrigation conduit of this invention comprises first and second elongated tubes, each of which has an interior with the interior of the first tube being adapted to communicate with a source of water under pressure. The tubes are constructed of sheet material, and the drip irrigation conduit has an outer wall of sheet material which defines the outer periphery of both of the tubes. To separate the interiors of the tubes, a common wall of sheet material extends from one region of the outer wall to another region of the outer wall.

To provide for transfer passage means of the type which are not so easily blocked, a portion of the common wall overlaps a portion of the outer wall. The overlapping portions have confronting surfaces. Means is provided for spacing regions of the confronting surfaces to thereby define transfer passage means which may include a plurality of transfer ports.

The overlapping portions can be spaced in different ways. However, it is preferred to provide surface irregularities on at least one of the confronting surfaces. These irregularities cooperate with the other of the confronting surfaces to define the transfer ports. For example, irregularities may be formed by embossing one of the overlapping portions. The result of the embossing operation may be a series of channels or grooves formed as depressions in the sheet material and/or it may result in corrugating one or both of the overlapping portions. The irregularities in the confronting surfaces can be repeated at desired intervals along the full length of the overlapping portions.

It is usually necessary or desirable that the transfer ports provide some significant restriction and pressure loss for the water flowing therethrough. With the typical prior art construction, the pressure drop is achieved by utilizing small diameter ports which extend through a thin plastic wall separating the two tubes. These small diameter transfer ports are subject to blockage.

With this invention, the transfer ports can be made of larger cross-sectional area, and a significant pressure drop across the ports is also obtained. This is accomplished by increasing the length and cross-sectional area of the transfer ports. The overlapping portions of the outer wall and the common wall overlap sufficiently to provide transfer ports of the desired length.

The discharge orifices are also preferably somewhat elongated so that they can be of larger cross-sectional area. The discharge orifices can be advantageously formed by overlapping portions of the outer wall and by spacing regions of such overlapping portions as described above in connection with the transfer ports.

An additional pressure drop is obtained as the water flows through the second tube. The second tube can advantageously be in the form of a capillary tube which provides high frictional resistance to the flow of water therethrough.

The multiple passage irrigation conduit may be constructed of flexible plastic material, such as polyethylene. The surface irregularities, in addition to creating the transfer ports, also provide sufficient rigidity to the flexible plastic material so that the water pressure within the first tube does not force the overlapping portions so tightly together that the transfer ports collapse.

Another advantage of using overlapping portions of sheet material to define the transfer ports is that some degree of pressure compensation can be obtained. To obtain pressure compensation, it is necessary to vary the resistance to fluid flow with inlet pressure variations so as to tend to maintain a substantially constant flow rate. Some degree of pressure compensation can be achieved if a section of one of the overlapping portions is resilient and exposed to the fluid under pressure in the first tube so that the water under pressure can resiliently deflect such section to vary the effective cross-sectional area of the transfer ports.

The outer wall of the irrigation conduit can advantageously be formed from a section of sheet material with portions of that section being overlapped and joined together longitudinally. Preferably, the outer wall and the common wall are formed from a single piece of sheet material.

The section of sheet material from which the outer wall is formed can be joined together in various different ways. However, with the present invention, this can be accomplished without welding the sheet material together at the factory. Rather, the irrigation tube is formed as a single piece of sheet material and is shipped in a flat condition to the job site where it is assembled. By wrapping or rolling the piece of sheet material together in a helical fashion, the diameter of the supply tube and the length of the discharge tube per foot of the conduit can be selected to meet each particular irrigation requirement.

In a preferred construction, the common wall and a portion of the outer wall adjacent the common wall cooperate to define an elongated socket. The outer wall also has a longitudinal edge portion which is receivable in the socket. Interengaging means on the socket and the longitudinal edge portion retain the edge portion in the socket. Thus, the irrigation conduit can be, in effect, zipped together.

When the socket construction described above is utilized, the engaging means for retaining the edge portion in the socket can include the overlapping portions which define the transfer ports. The discharge orifices can be similarly defined between overlapping portions of the outer wall.

The invention, together with further features and advantages thereof, may best be understood by reference to the following description taken in connection with the accompanying illustrative drawing.

BRIEF DESCRIPTION OF THE DRAWING

FIG. 1 is a fragmentary side elevational view showing a drip irrigation conduit constructed in accordance with the teachings of this invention.

FIG. 2 is an end elevational view of the drip irrigation conduit and shows the configuration of the conduit throughout its full length.

FIG. 3 is an enlarged fragmentary elevational view of a portion of the drip irrigation conduit.

FIG. 4 is an enlarged fragmentary sectional view taken generally along line 4—4 of FIG. 3 and illustrating one way in which the transfer ports may be formed.

FIG. 4A is a sectional view taken generally along line 4A—4A of FIG. 3.

FIG. 5 is a fragmentary sectional view similar to FIG. 4 showing an alternate way in which the transfer ports may be formed.

FIG. 6 is an enlarged fragmentary sectional view taken on the same plane as FIG. 4A showing another way in which the transfer ports may be formed.

FIG. 7 is an end elevational view of the section of sheet material from which the drip irrigation conduit is formed.

FIG. 8 is an enlarged fragmentary side elevational view showing a second embodiment of drip irrigation conduit constructed in accordance with the teachings of this invention.

DESCRIPTION OF THE PREFERRED EMBODIMENTS

FIG. 1 shows a drip irrigation conduit 11 which comprises a supply tube 13 and a discharge tube 15. In the pressurized condition shown in FIG. 2, the supply tube 13 is generally cylindrical, and the discharge tube 15 is of an irregular polygonal configuration.

The tubes 13 and 15 have an outer wall 17 which defines the outer periphery of the tubes and the drip irrigation conduit. The tube 13 has an interior, or a supply passage 19, of relatively large cross-sectional area, and the discharge tube 15 has an interior, or discharge passage 21, of substantially less cross-sectional area than the supply passage 19. In the embodiment illustrated, the discharge passage 21 is of sufficiently small cross-sectional area so as to constitute a capillary passage. In the embodiment of FIGS. 1–7, the discharge passage 21 has an axis which extends parallel to the axis of the supply passage 19, i.e., the discharge passage extends linearly along the outer periphery of the conduit 11.

The tubes 13 and 15 have a common wall 23 of sheet material which extends from one region of the outer wall 17 to another region of the outer wall 17 to separate the passages 19 and 21. Preferably, the common wall 23 forms a segment of a cylinder which is similar to the cylindrical configuration of the other portions of the pressurized supply tube 13 so that a minimum of turbulence is created as water flows through the supply passage 19.

Although the outer wall 17 and the common wall 23 can be constructed in different ways and of different materials, in the embodiment illustrated, they are continuously extruded from a flexible, impervious organic polymer, such as plasticized polyvinyl chloride, polyethylene or the like, as a one-piece, integral extruded profile or piece 25 of sheet material (FIG. 7). As shown in FIG. 7, the piece 25 of sheet material is ready for shipment to an irrigation site where it can be assembled. Because the sheet material is flexible, the tubes 13 and 15 are collapsible. The tubes 13 and 15 are shown in the pressurized condition in FIGS. 1–3 and 8.

The piece 25 of sheet material has a leg segment 27 which cooperates with the common wall 23 (which defines a second leg segment) to define a longitudinally extending socket 29. Flanges 31 and 33 extend inwardly and also define a portion of the socket 29. The flanges 31 and 33 constitute inturned edge portions of the leg segments 23 and 27, respectively, and are spaced apart to define an opening 35 to the socket. Longitudinally extending ribs 37 on the flanges 31 and 33 strengthen these flanges. Inclined flanges 39 and 41 are formed integrally along the opposite longitudinal edge portion of the piece 25 of sheet material.

To construct the conduit 11 from the integral piece 25 of sheet material, the flanges 39 and 41 are inserted through the opening 35 into the socket 29 as shown in FIG. 3. The flanges 31, 33, 39 and 41 and/or the leg segments 23 and 27 are sufficiently resilient to allow this. The flanges 39 and 41 engage the flanges 33 and 31, respectively, as shown in FIG. 3 to form engaging means for preventing the withdrawal of the flanges 39 and 41 from the socket 29. The flange 31 may be welded intermittently along its length to adjacent portions of the outer wall 17 by welds 43 (FIG. 1) to positively lock the flanges 31 and 41 against movement relative to each other.

The supply passage 19 is adapted to communicate with a source of water or other liquid under pressure. It is necessary to allow the water in the supply passage 19 to travel first to the discharge passage 21 and then to the exterior of the conduit 11. To accomplish this, overlapping portions of the outer wall 17 and the common wall 23 are utilized. Specifically, the overlapping flanges 33 and 39 are utilized to obtain a flow path into the discharge passage 21, and the overlapping flanges 31 and 41 are used to obtain a flow path out of the discharge passage. Although this can be accomplished in different ways, in the embodiment illustrated, the flange 39 has surface irregularities in the form of a plurality of elongated grooves 45 formed therein by a suitable embossing technique which compresses the flange 39 across its thickness to form the grooves. As shown in FIG. 4A, the flanges 33 and 39 have confronting surfaces 47 and 49, respectively. The grooves 45 are formed in the surface 49 with the surface 47 closing off the upper end of the grooves to form transfer ports 50 which lead from the passage 19 to the passage 21. Of course, the grooves may be formed in the confronting surface 47 in addition to, or in lieu of, the surface 49. The grooves 45 may be provided at any desired spacing, and in the embodiment illustrated, the grooves are closely spaced. Of course, portions of the flange 39 may have no grooves so that the transfer ports 50 appear intermittently along the length of the conduit 11.

FIG. 5 shows an alternative form of grooves 45a in the flange 39 with the grooves 45a forming a diamond pattern. Obviously, other configurations are possible.

Alternatively, the flange 39 may be embossed or corrugated as shown in FIG. 6 to define grooves 45b. The grooves 45b cooperate with the confronting surface 47 to define transfer ports 50b. The corrugated flange 39 has peaks 51 which contact the confronting surface 47. The transfer ports 50b are separated from each other by the engagement of the peaks 51 with the surface 47. If corrugations are used, the thickness of the flange 39 need not be reduced in order to provide the transfer ports 50b.

Similarly, the flanges 31 and 41 have confronting surfaces, and either or both of these confronting surfaces may have grooves or corrugations of the type shown in FIGS. 4–6. The flanges 31 and 41 and the flanges 33 and 39 tend to be held together by the fluid under pressure within the conduit 11. In the embodiment illustrated, the flange 41 has grooves of the type shown in FIG. 4 which define a plurality of discharge orifices 53 along the length of the flange 41. Although the spacing of the discharge orifices 53 can be varied, in the embodiment illustrated, they are closely adjacent. However, the intermittent welds 43 (FIG. 1) seal off a number of the discharge orifices 53 so that dripping is obtained intermittently along the length of the conduit 11. This also causes the water to flow for some distance through the passage 21 so that the high frictional resistance provided by this passage can provide a substantial pressure drop.

It should be noted that the flanges 33 and 39 and the flanges 31 and 41 overlap to some significant degree. This means that the transfer ports 50, even when formed by the straight grooves 45, are elongated and have appreciable length. This enables the cross-sectional area of each of the transfer ports 50 to be relatively large. Of course, by making the grooves 45a extend diagonally, as shown in FIG. 5, additional length is obtained without further overlapping the flanges 33 and 39. Thus, the length of the transfer ports 50 is much longer than the length of a port formed by an orifice through a thin piece of plastic.

Another feature of the use of the overlapping flanges 33 and 39 to provide the transfer ports 50 is that some degree of pressure compensation can be obtained. As best seen from FIG. 4A, the fluid under pressure within the discharge passage 21 acts against the flange 33 and tends to urge portions of the flange 33 into the transfer ports 50. The flange 33 is preferably sufficiently resilient to allow this to occur. Thus, when the pressure in the supply passage 19 is relatively high, the fluid under pressure urges portions of the flange 33 into the transfer ports 50 to reduce their cross-sectional area so that a greater pressure drop is taken across them than when the pressure was low. In this manner, some degree of pressure compensation is obtained.

If desired, the conduit 11 may include exterior ribs 55 formed on the outer wall 17 in any suitable pattern, such as the diamond pattern illustrated. The ribs 55 provide some additional rigidity for the conduit 11 while improving its appearance and may be applied after the piece 25 of sheet material is formed as shown in FIG. 2.

In use, water under pressure is supplied to the supply passage 19 in any conventional manner. The water flows with a pressure drop through the transfer ports 50 into the discharge passage 21. The water also flows in the discharge passage 21, and the high friction provided by this capillary passage further reduces the water pressure. The water leaves the discharge passage 21 via the discharge orifices 53 and passes to the area to be irrigated. Although only two tubes 13 and 15 are shown, obviously additional tubes may be provided, if desired. Some pressure compensation is obtained at the transfer ports 50 as described above.

FIG. 8 shows a conduit 11a which is identical to the conduit 11, except that the ribs 55 have been eliminated and the piece 25 of sheet material has been wrapped so that the discharge tube 15 extends helically around the supply tube 13. This provides a greater concentration of the discharge orifices 53 and, consequently, additional irrigation capacity.

The irrigation conduit may be shipped in the flat, unassembled configuration shown in FIG. 7 or it may be assembled at the manufacturer's plant. One advantage of field assembly is that the conduit can be assembled as shown in FIGS. 1–3 or 8 depending upon the irrigation requirements.

Although exemplary embodiments of the invention have been shown and described, many changes, modifications and substitutions may be made by one having ordinary skill in the art without necessarily departing from the spirit and scope of this invention.

I claim:

1. A drip irrigation conduit comprising:
    first and second elongated tubes, each of said tubes having an interior, the interior of said first tube being adapted to communicate with a source of water under pressure;
    said tubes including an elongated section of flexible sheet material having a first longitudinal edge portion and spaced leg segments extending along the other longitudinal edge portion of said sections to define a socket;
    said elongated section defining the outer periphery of said first tube and said first longitudinal edge portion being received in said socket;
    engaging means on said first longitudinal edge portion and on at least one of said leg segments for retaining said first longitudinal edge portion in said socket;
    said leg segments at least partially defining said second tube;
    transfer passage means leading from the interior of said first tube to the interior of said second tube; and
    discharge passage means leading from the interior of said second tube to the exterior of said section of flexible sheet material.

2. A drip irrigation conduit as defined in claim 1 wherein said engaging means includes a first pair of spaced flanges on said leg segments and an enlargement on said first longitudinal edge portion.

3. A member which can be formed into a multiple passage drip irrigation conduit comprising:
    an elongated section of sheet material;
    said elongated section having a first longitudinal edge portion and including first and second leg segments adjacent the opposite longitudinal edge portion of said elongated section;

said leg segments being elongated in the direction of elongation of said elongated section and defining a socket having opening means, said elongated section having a body portion intermediate said leg segments and said first longitudinal edge portion;

said elongated section being flexible to permit said elongated section to be formed into a multiple passage irrigation conduit with at least a region of said first elongated edge portion being received in said opening means of said socket whereby one of the leg segments and said body portion can at least partially define a first tube of the multiple passage irrigation conduit and said leg segments can at least partially define a second tube of said multiple passage irrigation conduit;

engaging means on said region of said first longitudinal edge portion and at least one of said leg segments for retaining said region in said socket;

means on said elongated section defining transfer passage means at least when said elongated section is formed into said multiple passage irrigation conduit which leads from the interior of the first tube to the interior of the second tube; and means on said elongated section defining discharge passage means at least when said elongated section is formed into the multiple passage irrigation conduit, said discharge passage means leading from the interior of said second tube to the exterior of said elongated section.

4. A member as defined in claim 3 wherein said elongated section is a single one-piece extruded member of imporous, flexible plastic material.

5. A member as defined in claim 3 wherein said engaging means includes first and second elongated flanges on said first and second leg segments, respectively, and an enlargement on said region of said first longitudinal edge portion.

6. A member as defined in claim 3 wherein said engaging means includes a flange on said first leg segment and a flange on said region of said first longitudinal edge portion, said flanges overlapping when the elongated section is formed into the multiple passage irrigation conduit, and means for spacing said flanges to define at least a portion of said transfer passage means when said elongated section is formed into said multiple passage irrigation conduit.

7. A drip irrigation conduit comprising:

first and second elongated tubes, said second tube extending along said first tube, each of said tubes having an interior, the interior of said first tube being adapted to communicate with a source of water under pressure;

said first tube being a supply tube and the interior of said second tube being an elongated capillary passage which provides high resistance to the flow of water therethrough;

said tubes having an outer wall of sheet material defining the outer periphery of said tubes;

said tubes having a common wall of sheet material extending from one region of the outer wall to another region of the outer wall to separate the interiors of said tubes;

a portion of said common wall overlapping a portion of the outer wall, said overlapping portions having confronting surfaces;

at least one of said overlapping portions having an embossed configuration for spacing at least regions of said confronting surfaces to define transfer passage means leading from the interior of said first tube to the capillary passage;

a plurality of discharge orifices in said outer wall leading from the capillary passage to the exterior of said outer wall whereby water can be distributed from the interior of said first tube through said transfer passage means, the capillary passage, and said discharge orifices to the exterior of said outer wall; and said common wall and a portion of said outer wall adjacent said common wall cooperating to define an elongated socket, said capillary passage being within said socket, said outer wall having a longitudinal edge portion which is receivable in said socket, and engaging means on said socket and said longitudinal edge portion for retaining said edge portion in said socket.

8. A drip irrigation conduit as defined in claim 7 wherein said outer wall and said common wall are formed from a single integral piece of sheet material 9. A drip irrigation conduit as defined in claim 7 wherein at least a section of at least one of said overlapping portions is resilient and is exposed to the interior of said first tube whereby the fluid under pressure in the interior of said first tube can resiliently deflect said section to vary the effective cross-sectional area of the transfer passage means to thereby obtain at least some pressure compensation.

10. A drip irrigation conduit as defined in claim 7 wherein said engaging means includes said overlapping portions.

11. A drip irrigation conduit as defined in claim 1 wherein said engaging means includes overlapping portions of said outer wall, said drip irrigation conduit including irregularities on at least one of said last-mentioned overlapping portions for holding regions of said last-mentioned overlapping portions apart to define said discharge orifices.

12. A drip irrigation conduit as defined in claim 7 wherein said second tube extends axially and circumferentially of said first tube.

13. A drip irrigation conduit as defined in claim 7 wherein said embossed configuration includes a plurality of elongated grooves in said one overlapping portion whereby said grooves define at least portions of said transfer passage means.

14. A drip irrigation conduit as defined in claim 7 wherein said embossed configuration includes a corrugated configuration whereby the corrugated configuration defines at least a portion of said transfer passage means.

15. A drip irrigation conduit as defined in claim 7 wherein said transfer passage means includes at least one elongated transfer port leading from the interior of said first tube to the interior of said second tube.

* * * * *